No. 675,598. Patented June 4, 1901.
A. HAWORTH.
CHURN.
(Application filed Sept. 13, 1900.)
(No Model.) 2 Sheets—Sheet 1.
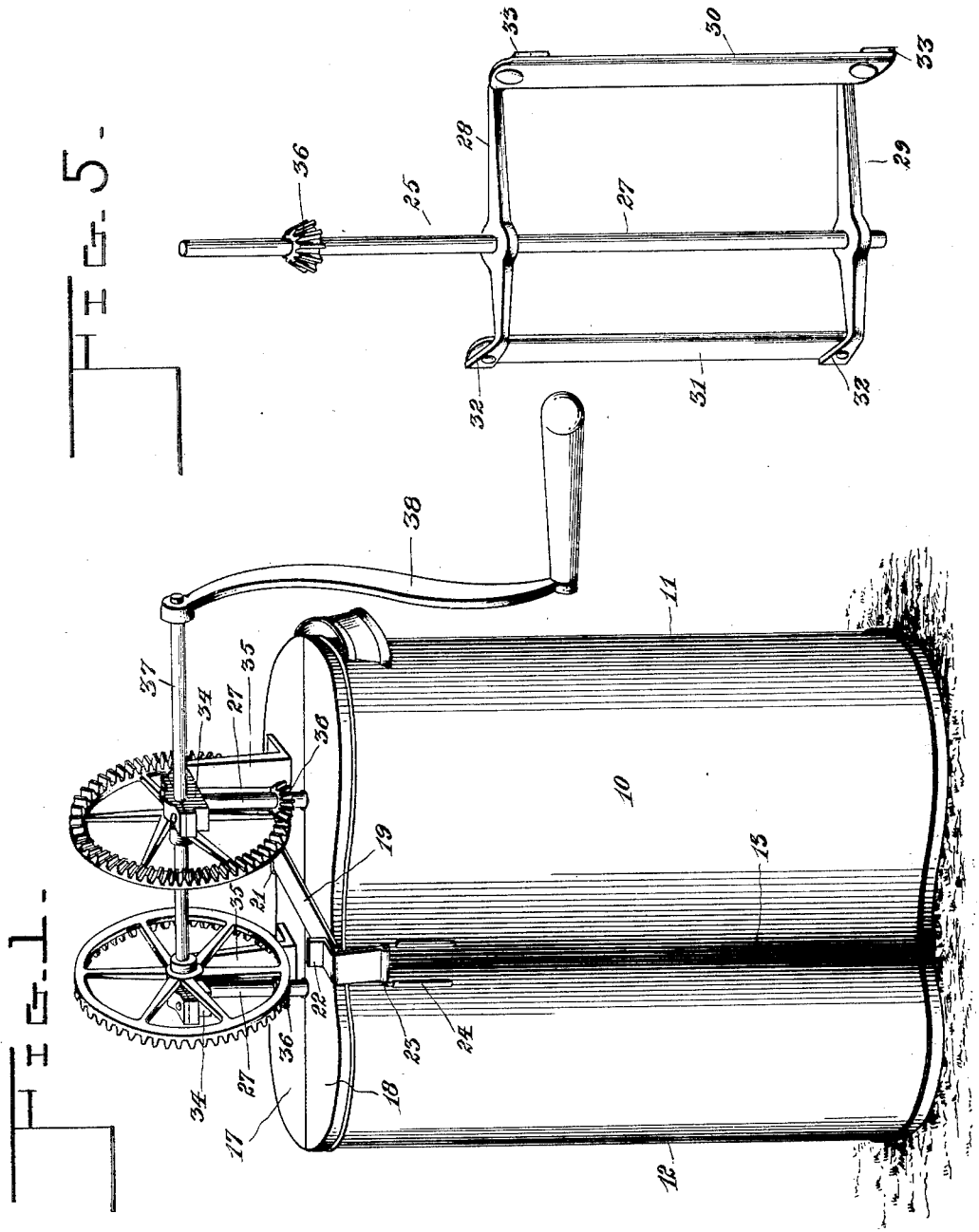
Witnesses: Allen Haworth, Inventor
By Marion Marion,
Attorneys

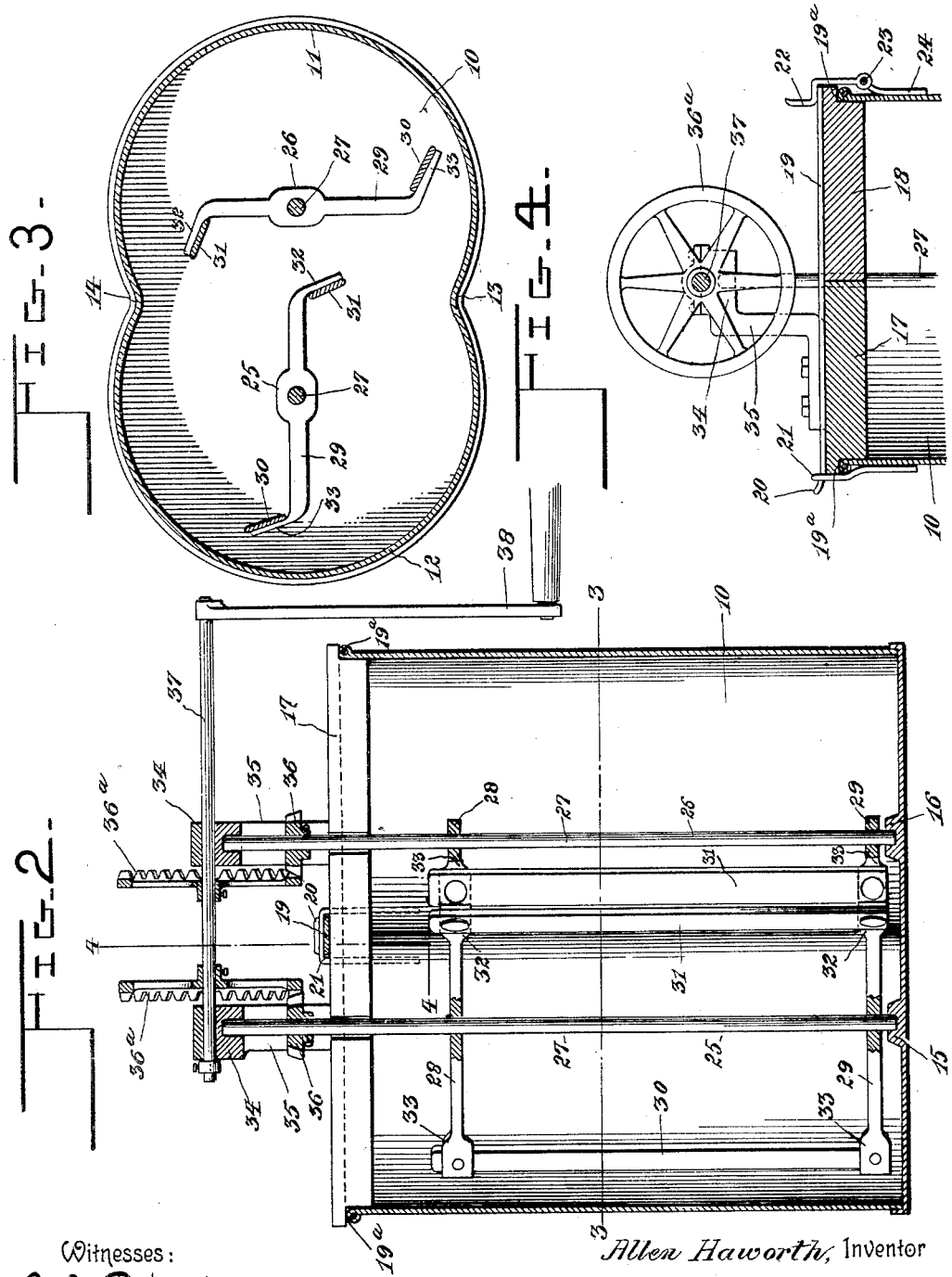

UNITED STATES PATENT OFFICE.

ALLEN HAWORTH, OF HILLSBORO, OREGON.

CHURN.

SPECIFICATION forming part of Letters Patent No. 675,598, dated June 4, 1901.

Application filed September 13, 1900. Serial No. 29,890. (No model.)

*To all whom it may concern:*

Be it known that I, ALLEN HAWORTH, a citizen of the United States, residing at Hillsboro, in the county of Washington, State of Oregon, have invented certain new and useful Improvements in Churns; and I do hereby declare that the following is a full, clear, and exact description of the invention, such as will enable others skilled in the art to which it appertains to make and use the same.

My invention relates to improvements in churns of that class which employ vertical dashers driven from a common operating mechanism.

One object of the invention is to provide an improved construction and arrangement of the dashers by which the cream is violently agitated in a manner to cause eddying currents which intersect one with the other, whereby the particles of butter are freed and the operation of churning is greatly facilitated.

A further object of the invention is to construct the churn vessel in a manner to break up the currents of the cream created by the action of the dashers, the latter being arranged to direct the cream inwardly toward the axis of rotation of the dashers themselves, whereby the cream is made to pursue such paths as will tend to separate the butter particles quickly.

Further objects and advantages of the invention will appear in the course of the subjoined description, and the novelty in the construction and arrangement of parts will be defined by the claims.

In the drawings hereto annexed, forming a part of this specification, Figure 1 is a perspective view of a double-dasher churn embodying my improvements. Fig. 2 is a vertical central sectional view thereof. Fig. 3 is a horizontal cross-section taken in the plane of the dotted line 3 3 on Fig. 2. Fig. 4 is a detail vertical section taken in the plane of the dotted line 4 4 on Fig. 2, illustrating the two-part cover and the clamp for locking the cover members in place. Fig. 5 is a detail perspective view of one of the dashers removed from the churn vessel.

The same numerals of reference are used to indicate like parts in the several figures of the drawings.

The churn vessel 10 has its end portions made curved in cross-section at 11 12, as shown more clearly by Fig. 3, and these curved walls meet or intersect to form the crests 13 14, the latter being located at the middle of the vessel and on opposite sides thereof. Said vessel may be made of sheet metal or any other suitable material, and it has an imperforate bottom, which at suitable points is provided with the step-bearings 15 16, each bearing being located at the center of the circle which bounds one-half or the curved portion 12 or 13 of said vessel.

The upper portion of the vessel is open for the ready introduction of the two vertical dashers, presently described, and said open end of the vessel is intended to be tightly closed by a cover or lid, which in the example shown is composed of two members or sections 17 18, said members meeting each other at the middle of the vessel. (See Fig. 4.) Said cover members are rabbeted at their edges to form the shoulders 19$^a$, by which they rest upon the churn vessel, and said members of the cover are provided in their edges with matching recesses, adapted to form the openings through which the dasher-staffs may project. The two cover members are held in place by means of a locking-bar 19, arranged across the cover, at the middle thereof, and said bar is provided with an upturned end 20, which is fitted in a loop or keeper 21, the latter being secured to the vessel, on one side thereof. The other end of the locking-bar is engaged by a shouldered catch 22, which has a hinged or pivotal connection at 23 with a strap or plate 24, which is secured to the other side of the vessel. It is evident that the catch may be thrown down on its hinge 23 to withdraw the shoulder from the locking-bar, and the latter may then be removed from the keeper and from the cover, and finally the members of said cover may be taken off the vessel, thus permitting of the easy removal of the dashers for the purpose of cleansing the latter. The dashers and the cover may be replaced and the locking contrivance again adjusted when it is desired to use the churn.

The dashers 25 26 are placed in the churn vessel to occupy vertical positions substantially parallel one to the other, and said dashers are adapted to rotate in circular paths and in such relation that the path of the blades on one dasher intersects with the path described by the blades on the other dasher. (See Fig. 3.) Each dasher consists of a staff 27, the upper and lower bars 28 29, and the vertical blades 30 31, all arranged as shown more clearly by Figs. 3 and 5. The bars 28 29 are secured to the staff 27 at proper intervals and so as to lie parallel to each other, and each bar has its end portions bent at an angle, as at 32 33, said angular ends extending in opposite directions from the dasher-staff. The vertical blades 30 31 are attached to these angular ends of the bars, so that they will face in opposite directions and act on the cream in a manner to give the same a movement toward the plane of the axis of rotation of the dasher. The bars 28 29 are not secured centrally to the dasher-staff, but they are attached thereto more to one side than the other, whereby the blade 31 lies closer to the staff than the other blade, 30, and the two blades are adapted to create different currents in the cream. The dasher 25 is arranged in the vessel so that its minor axis will in a given position of both dashers lie in a plane at right angles to the corresponding axis of the other dasher, 26, (see Fig. 3,) and thus the two dashers are adapted to describe circular paths which intersect.

The staffs 27 of the dashers are projected or extended above the longitudinally-divided cover in order that the upper extremities may find bearings in the overhanging blocks 34, which are supported by the standards 35 on one cover member. Each dasher-staff has a bevel gear-pinion 36, and the pinions of the two dasher-staffs are arranged to mesh with the bevel driving-gears 36ª, which are attached to the operating-shaft 37, the latter being journaled in suitable bearings of the blocks 34 and being provided with a crank-handle 38.

From the foregoing description, taken in connection with the drawings, it will be seen that I have provided a dasher operating or driving mechanism adapted to make the two dashers rotate simultaneously in opposite directions. This has the effect of making the current created by the action of one dasher impinge the current of the other dasher, besides commingling the two currents. Furthermore, the currents of the dashers sweep against the crests of the churn vessel. The blades of each dasher lie at different distances from the staff, so as to make each dasher generate different currents, and on the whole the cream is so violently agitated that the butter particles are separated more expeditiously and the churning operation is accomplished in less time and with greater ease. This result is due to the fact that two blades are used in each dasher, the blades being arranged at such an angle as to tend to move the material toward the axis of rotation of the dasher and the blades following each other in such order that the two blades having their paths of movement of equal diameters follow one another in passing through the space between the two vertical axes. By this construction the various currents formed within the churn are broken up at a point toward which the material not in the direct path of movement of the blades is forced, owing to the fact that such blades direct the material toward the axis of rotation and the absence of an opposing blade on the opposite side of the shaft having the same radius. In other words, the material is directed toward the center of the churn, where the successive movements of the blades through the space between the two shafts act continually to drive it to opposite ends of the churn, in doing which it is forced through the path of movement of an opposing blade. Thus the agitation at this point communicates with all parts of the churn, driving the material from the walls, and thus into the path of movement of the blades, so that in all parts of the chamber the material is being agitated with the greatest movement at a point midway of the ends of the churn.

Changes within the scope of the appended claims may be made in the form and proportion of parts, while their essential features are retained and the spirit of the invention is embodied. Hence I do not desire to be limited to the precise form of all the parts as shown, reserving the right to vary therefrom.

Having thus fully described the invention, what I claim as new is—

1. A double-dasher churn comprising a vessel having curved end portions joined by inwardly-extending portions forming crests on opposite sides of the chamber and midway thereof; vertically-extending dashers mounted within and substantially central of the end portions of the chamber, each dasher having a pair of vertically-extending blades fixedly mounted thereon and located at different distances from the axis of rotation of the dasher, said blades having a fixed path of movement concentric with the said axis, said paths being located intermediate the walls of the chamber and the axis of rotation, the path of movements of the respective blades passing through the path of each of the other blades, the two blades having a path of movement of equal diameter following each other in passing through the space between the axes of rotation of the respective dashers; and means for imparting a simultaneous rotatory movement to said dashers, whereby the center of agitation will be at a point intermediate the two axes of rotation, due solely to the passage of the blade of one dasher through the path of movement of the corresponding blade of the other dasher.

2. A double-dasher churn comprising a vessel having the curved portions forming the inwardly-projecting crests arranged on opposite sides of said vessel and at the middle portion of the chamber thereof, the vertical eccentrically-mounted dashers arranged in the respective curved vessel portions and concentric therewith, each dasher having the reversely-inclined blades facing in opposite directions and lying at different distances from the axis of rotation of said dasher, said blades having a fixed path of movement concentric with said axis, said paths of movement being located intermediate the walls of the chamber and the axis of rotation of the dashers, said vertical blades and the dasher-staff being joined rigidly together by short and long arms which are on opposite sides of the dasher-staff, the two blades having a path of movement of equal diameter following each other in passing through the space between the axis of rotation of the respective dashers, and a driving mechanism for rotating the two dashers simultaneously in opposite directions, substantially as described.

In witness whereof I have hereunto set my hand in the presence of two witnesses.

ALLEN HAWORTH.

Witnesses:
 J. C. LAMKIN,
 O. C. ZOOK.